United States Patent [19]

Dowe et al.

[11] Patent Number: 4,821,053
[45] Date of Patent: Apr. 11, 1989

[54] PHOTOGRAPHIC FLASH DEVICE

[75] Inventors: David R. Dowe, Holley; Paul L. Ruben, Penfield, both of N.Y.

[73] Assignee: Eastman Kodak Company, Rochester, N.Y.

[21] Appl. No.: 191,458

[22] Filed: May 9, 1988

[51] Int. Cl.⁴ .......................... G03B 15/03; F21V 7/16
[52] U.S. Cl. ................................. 354/149.1; 362/18; 362/278
[58] Field of Search ............... 354/413, 149.1; 362/18, 362/276, 278

[56] References Cited

U.S. PATENT DOCUMENTS

| 3,839,632 | 10/1974 | Federico | 362/278 |
| 4,323,952 | 4/1982 | Proske | 362/18 X |
| 4,423,940 | 1/1984 | Kashihara et al. | 354/149.1 |
| 4,594,645 | 6/1986 | Terashita | 362/278 X |
| 4,666,280 | 5/1987 | Miyawaki et al. | 354/149.1 X |
| 4,729,065 | 3/1988 | Bahnemann et al. | 362/18 |

FOREIGN PATENT DOCUMENTS

| 2740558 | 3/1979 | Fed. Rep. of Germany | 354/149.1 |
| 6932 | 1/1985 | Japan | 354/149.1 |
| 52831 | 3/1985 | Japan | 354/149.1 |
| 138242 | 6/1986 | Japan | 354/149.1 |
| 182030 | 8/1986 | Japan | 354/149.1 |
| 208040 | 9/1986 | Japan | 354/149.1 |

Primary Examiner—W. B. Perkey
Attorney, Agent, or Firm—John B. Turner

[57] ABSTRACT

Photographic flash device has its trough-shape reflector formed of a laminate of first and second sheets of piezoelectric material so polarized relative to one another that a change in potential across the laminate, applied by electrodes on the laminate, causes a flexing of the laminate and hence a change in the light pattern on the subject being photographed. Such a flash device is useful with zoom camera.

6 Claims, 2 Drawing Sheets

PHOTOGRAPHIC FLASH DEVICE

BACKGROUND OF THE INVENTION

1. Field of the Invention

This invention relates to devices for illuminating a subject to be photographed by a camera having a zoom lens.

2. Description Relative to the Prior Art

It is axiomatic that as a zoom camera is zoomed from wide angle to telephoto, so the field of view decreases. Likewise the field of view increases as the camera is zoomed from telephoto to wide angle. If the source of flash illumination associated with the camera, be it a separate gun or a built in strobe, is constructed so that it properly illuminates the scene for a wide angle photograph, then much of the light from the source will be wasted when a telephoto photograph is taken. Similarly, if the source is constructed so that it properly illuminates the scene for a telephoto photograph, then much of the scene will be underlit when the camera is set for a wide angle photograph.

Proposals have been made for overcoming the above-described problem. Such proposals have included a fresnel lens movable between positions in which it is in, and in which it is out of, the light path from the source, in order to vary the included angle of the light beam. Another proposal has included moving the flash tube relative to the reflector so that the included angle of the projected beam is changed. Both proposals have been found to be liable to create uneven illumination of the subject being photographed. It is believed that such uneven illumination is created by shadows of the flash tube.

SUMMARY OF THE INVENTION

It is an object of the present invention to overcome the problems of the prior art.

In accordance with the present invention there is provided a device for producing a flash for illuminating a subject to be photographed by a camera having a zoom taking lens. The device includes a reflector having a trough shape and a tubular device for creating light. The tubular device is disposed within and extends along the trough shape of the reflector. The reflector is formed of a laminate of a first sheet of piezoelectric material and a second sheet of material, the two sheets being bonded together so that a change in dimension of the first sheet causes a flexing of the laminate and, thereby, a change in the trough shape. The trough shape reflector is reflective at the side facing the tubular device. There are means for applying an electric potential difference across the first sheet of material whereby a change in the potential difference causes a flexing of the laminate which changes the trough shape, which change in trough shape varies the illumination pattern created by a flash from the tubular device so as to accommodate a change in the focal length of the zoom taking lens of the camera.

BRIEF DESCRIPTION OF THE DRAWINGS

An embodiment of the present invention will now be described by way of example, with reference to the accompanying drawings, in which.

DETAILED DESCRIPTION OF THE PREFERRED EMBODIMENT

Figure 1:
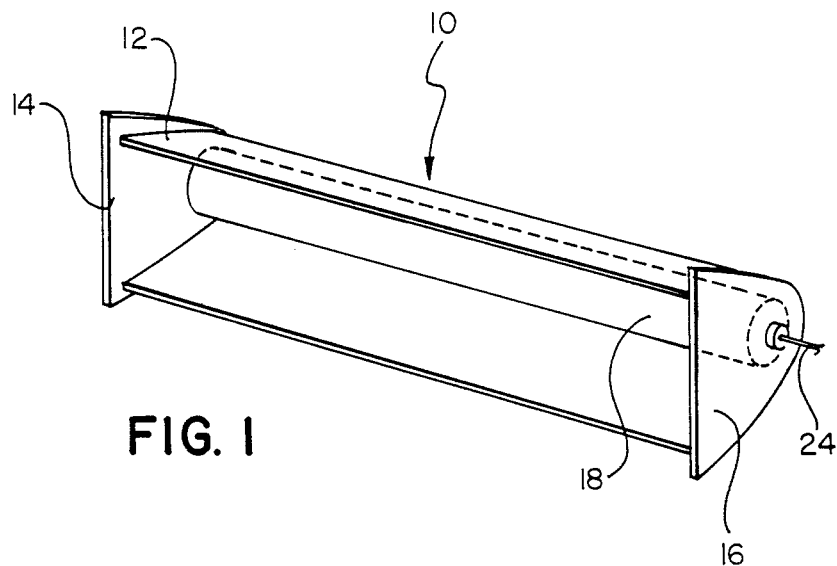
FIG. 1 is a perspective view of a device, in accordance with the present invention, intended to be built into a zoom camera.
Figure 2:
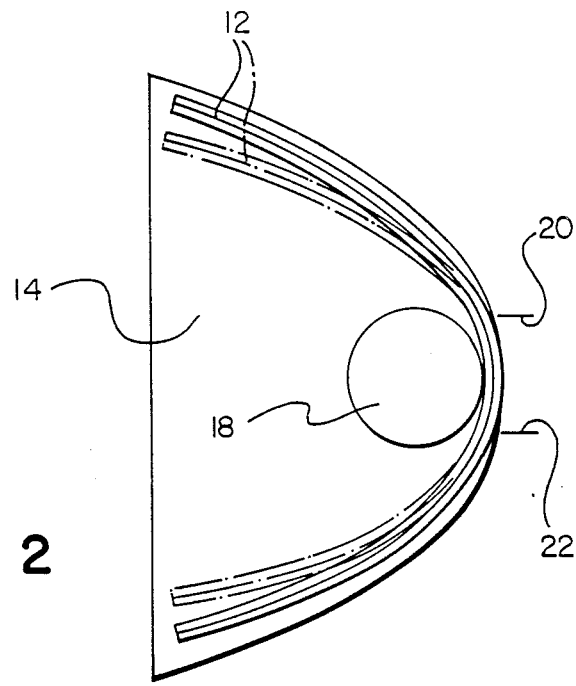
FIG. 2 is a cross section through the device.

In FIG. 1 there is illustrated a device 10 for illuminating a subject to be photographed and intended to be built into a photographic zoom camera. The device 10 includes a reflector 12, end caps 14, 16 and a tubular device 18 for creating light. The reflector 12, as is known, has a trough shape with a cross-section, as shown in FIG. 2. The ends of the trough-shape reflector 12 are closed by the end caps 14, 16. The end caps 14, 16 are secured to the reflector 12 only in the region between the lines 20 and 22 in FIG. 2, so that the reflector portions extending away from that region are free to move, generally perpendicularly to their planes, relative to the end caps 14, 16, as is illustrated in solid and chain lines in FIG. 2. The tubular device 18 for creating light extends along which may be regarded as the bottom of the trough shape and is of the well-known electric discharge type. The device 18 is connected, at its ends, to the end caps 14 and 16 and has electric terminals 24 extending through the end caps. The terminals are electrically isolated from the end caps 14 and 16.

Figure 3:
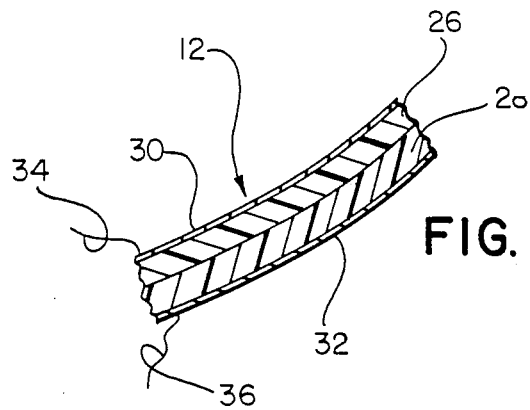
FIG. 3 is an enlarged view of a portion of FIG. 2.

The reflector 12 is formed of a laminate including a first sheet 26 (see FIG. 3) of material which exhibits piezoelectric characteristics. In the present embodiment the material of the first sheet 26 is polyvinylidene fluoride. The sheet 26 is so formed that if an electric potential difference is applied between its two faces the area of the sheet will change. The laminate includes a second sheet 28 which, in the present embodiment, is also formed of a material which exhibits piezoelectric characteristics. The second sheet 28 is also so formed that if an electric potential difference is applied between its two faces, the area of the sheet will change. The first and second sheets 26 and 28 are bonded to one another over their entire facing surfaces. On the surface of the first sheet 26 remote from the second sheet 28 there is an electrode 30. The electrode 30 is coextensive with the first sheet 26 and is bonded to it over their entire facing surfaces. The side of the electrode 30 remote from the first sheet 26 is highly reflective. On the surface of the second sheet remote from the first sheet, there is an electrode 32. The electrode 32 is coextensive with the second sheet and is bonded to the second sheet over their entire facing surfaces.

Electrical leads 34 and 36 extend from the electrodes 30 and 32, respectively.

The first and second sheets 26 and 28 are so oriented relative to one another, in relation to their piezoelectric characteristics (such orientation being termed 'polarization'), that as one expands in response to a change in potential difference between the electrodes 30 and 32, the other contracts in response to the same change in potential difference. If the first sheet 26 contracts and the second sheet expands, the laminate will flex from the solid line condition illustrated in FIG. 2 to the broken line condition shown in that Figure.

Figure 4:
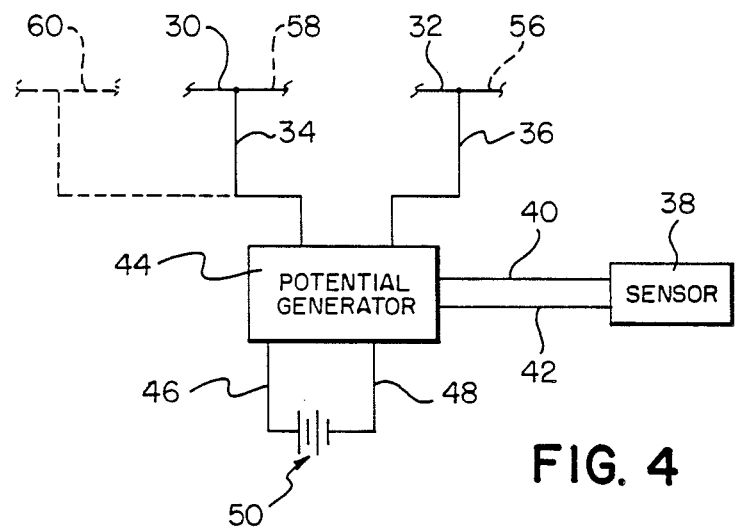
FIG. 4 is a diagrammatic representation of an electric circuit for use with the device illustrated in FIGS. 1, 2 and 3.

FIG. 4 illustrates diagrammatically an electric circuit for applying a potential over leads 34 and 36 to the electrodes 30 and 32, respectively. A sensor 38 senses the zoom condition of the taking lens of the camera and sends a signal over leads 40, 42 to a potential generator 44. The potential generator 44 generates a particular potential in response to a particular position signal from the sensor 38 and applies that potential difference to the electrodes 30 and 32 by leads 34 and 36. Power is supplied to the potential generator by leads 46, 48 from a battery 50 in the camera.

In operation, as the focal length of the camera lens is varied, or zoomed, the sensor 38 sends a signal indicative of the selected focal length, over leads 40, 42, to the potential generator 44. In response to the signal it receives, the potential generator 44 generates a potential difference which is appropriate for deforming the reflector 12 to an extent appropriate for creating an included angle in the beam of light emitted by the device 10, when the tubular device 18 is fired, which is appropriate for the focal length of the lens.

While in the embodiment specifically described above, the potential difference is continuously variable so that the reflector is deformable through an infinite number of shapes, in other embodiments the potential difference may have a plurality of discrete values. For example, there might be as few as two values, one of which might be zero. In such latter embodiment, the reflector has two conditions, namely an undeformed condition when no potential difference is applied to the electrodes 30, 32, e.g., the condition shown in solid lines in FIG. 2, and the other condition, e.g., the condition shown in plain lines in FIG. 2, when the potential difference is applied to the electrodes 30, 32. Such a simple embodiment might be appropriate for a camera with a zoom lens having a small zoom range.

Figure 5:
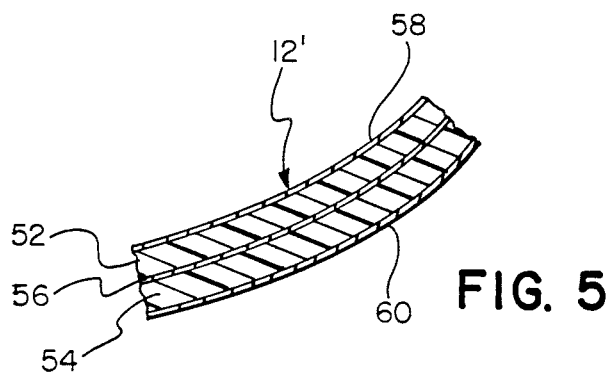
FIG. 5 is a view, similar to that of FIG. 3, but illustrating a second embodiment.

A second embodiment of the present invention is generally similar to the first embodiment described above with reference to FIGS. 1 to 4, except that the laminate forming the reflector is as illustrated in FIG. 5. In FIG. 5, the reflector is given the reference numeral 12'. The two sheets of piezoelectric material are given the reference numerals 52 and 54 and, while they have characteristics similar to those of the sheets 26 and 28, they are laid up, i.e. polarized, differently, as will become apparent. This second embodiment also differs from the first in that there is an electrode 56 between the sheets 52 and 54 as well as electrodes 58 and 60 on the mutually remote faces of the sheets 52 and 54.

The electrodes 58 and 60 are connected in parallel to a lead, such as lead 34, from potential generator 44. Reference is made to FIG. 4 wherein the arrangement appropriate for the second embodiment is illustrated in broken lines. The electrode 56, located between the sheets 52 and 54, would be connected to the lead 36. Thus, the outer electrodes 58 and 60 may be given a common potential different to that of the central electrode 56.

In the embodiments of the invention described above, there are two sheets of material in the laminate forming the reflector and both sheets are formed of a piezoelectric material. In other embodiments only one of the sheets may be piezoelectric and in such embodiments the one sheet would be bonded to another sheet the area of which would not change when the potential difference across the one sheet changes. However, the other, non-piezoelectric sheet would act as a reaction member causing an area change of the piezoelectric sheet to appear as flexing of the laminate in directions generally perpendicular to the plane of the laminate.

In yet other embodiments of the present invention there might be more than two sheets in the laminate. For example, there might be three sheets, the middle one of which is non-piezoelectric and the outer two of which are piezoelectric. In such embodiments, the two piezoelectric sheets and the electrodes in the reflector would all be so arranged, i.e. the polarization would be such, that as one sheet expands in area by virtue of a change in potential difference across it, the other piezoelectric sheet is contracting by virtue of the change in potential difference across it.

In the embodiment specifically described above, with reference to the drawings, the reflectivity of the reflector is gained from a highly reflective surface of the electrode on the inside face of the reflector. In other embodiments the reflectivity may be provided by a separate sheet of material having high reflectivity at least on its exposed surface. Such separate sheet might be the second sheet of the laminate, which second sheet does not exhibit piezoelectric characteristics but does act as a reaction member which causes an area change in the piezoelectric sheet to appear as a flexing of the laminate generally perpendicularly to the plane of the laminate.

The invention has been described in detail with particular reference to a presently preferred embodiment, but it will be understood that variations and modifications can be effected within the spirit and scope of the invention.

What is claimed is:

1. A device for producing a flash for illuminating a subject to be photographed by a camera having a zoom taking lens, including a reflector having a trough shape and a tubular device for creating light, the tubular device being disposed within and extending along the trough shape of the reflector, said reflector being formed of a laminate of a first sheet of piezoelectric material bonded to a second sheet of material, the trough-shape reflector being reflective at the side facing the tubular device, and means for applying an electric potential difference across the first sheet of material whereby a change in the potential difference changes the trough shape and the illumination pattern created by a flash from the tubular device changes to accommodate a change in the focal length of the zoom taking lens of the camera.

2. A device as claimed in claim 1, wherein said second sheet is also formed of piezoelectric material and said means for applying an electric potential difference across said first sheet applies an electric potential difference across said second sheet also.

3. A device as claimed in claim 2, wherein said second sheet is polarized oppositely to said first sheet, and said means for applying an electric potential difference includes electrodes at the opposite faces of the laminate.

4. A device as claimed in claim 2, wherein said second sheet is polarized similarly to said first sheet and said means for applying an electric potential difference includes first and second electrodes at the opposite faces of the laminate and a third electrode between said first and second sheets.

5. A device as claimed in claim 1, wherein said first sheet is formed by polyvinylidene fluoride.

6. A device as claimed in claim 2, 3 or 4, wherein the first and second sheets are formed of polyvinyldene fluoride.

* * * * *